United States Patent
Mundon

(10) Patent No.: US 11,293,398 B2
(45) Date of Patent: Apr. 5, 2022

(54) DRIVETRAIN FOR A WAVE ENERGY CONVERTER

(71) Applicant: Oscilla Power, Inc., Seattle, WA (US)

(72) Inventor: Timothy R Mundon, Seattle, WA (US)

( * ) Notice: Subject to any disclaimer, the term of this patent is extended or adjusted under 35 U.S.C. 154(b) by 0 days.

(21) Appl. No.: 16/896,170

(22) Filed: Jun. 8, 2020

(65) Prior Publication Data

US 2021/0010452 A1      Jan. 14, 2021

Related U.S. Application Data

(60) Provisional application No. 62/858,148, filed on Jun. 6, 2019.

(51) Int. Cl.
*F03B 13/18* (2006.01)

(52) U.S. Cl.
CPC .............. *F03B 13/1885* (2013.01)

(58) Field of Classification Search
CPC .......... F03B 13/26; F03B 13/16; F03B 13/14; F03B 13/188; F03B 13/1885; F03B 13/20; F03B 15/00; F05B 2240/93; F05B 2260/4031; F05B 2220/706; F05B 2240/97; F05B 2280/5001
See application file for complete search history.

(56) References Cited

U.S. PATENT DOCUMENTS

| | | | | |
|---|---|---|---|---|
| 6,247,308 | B1 * | 6/2001 | Solell | F03B 13/1815 60/495 |
| 7,443,046 | B2 * | 10/2008 | Stewart | F03B 13/20 290/53 |
| 2009/0309366 | A1 * | 12/2009 | Moore | F03B 13/1845 290/53 |
| 2012/0285544 | A1 | 11/2012 | Westby et al. | |
| 2013/0200626 | A1 * | 8/2013 | Sidenmark | F16H 1/46 290/53 |
| 2015/0054285 | A1 * | 2/2015 | Hobdy | H02K 7/1892 290/53 |
| 2017/0114769 | A1 * | 4/2017 | Pasanen | F03B 13/182 |

FOREIGN PATENT DOCUMENTS

| | | |
|---|---|---|
| CA | 2831560 A1 | 10/2011 |
| GB | 2469728 A | 10/2010 |

OTHER PUBLICATIONS

Thomas "PCT International Search Report for International Application No. PCT/US2020/036707" dated Sep. 4, 2020, 2 pages.
Thomas "Written Opinion of the International Searching Authority for International Application No. PCT/US2020/036707" dated Sep. 4, 2020, 7 pages.

* cited by examiner

*Primary Examiner* — Shafiq Mian
(74) *Attorney, Agent, or Firm* — Intellectual Strategies

(57) ABSTRACT

An apparatus, system, and method are disclosed for WEC system for a wave energy converter. The system includes a buoyant object, a reaction body and a line coupling the reaction body and the buoyant object. The system further includes a drivetrain coupled to one of the buoyant object or reaction body. The drivetrain includes a sheave coupled to one of the buoyant object or reaction body and an actuator coupled to the sheave. The line is coupled to the sheave, wherein movement of the buoyant object relative to the reaction body applies a force to the sheave. The force on the sheave drives the actuator, wherein the actuator is configured to apply a spring force.

11 Claims, 6 Drawing Sheets

DRIVETRAIN FOR A WAVE ENERGY CONVERTER

CROSS-REFERENCES TO RELATED APPLICATIONS

This application claims the benefit of U.S. Provisional Patent Application No. 62/858,148 entitled "TRITON-C DRIVETRAIN" and filed on Jun. 6, 2019 for Timothy R. Mundon, which is incorporated herein by reference.

FIELD

This invention relates to power generation and more particularly relates to a WEC system for a wave energy converter

BACKGROUND

Many different systems exist for power generation. With advances in technology comes the need to provide power to operate that technology. Frequently, power generation must be portable or able to collect energy from diverse environments without doing damage to that environment. Many conventional systems are restricted in where and how they may be deployed and also rely on wasteful, harmful, or unsustainable processes.

SUMMARY

The subject matter of the present application has been developed in response to the present state of the art, and in particular, in response to the problems and disadvantages associated with conventional wave energy converter systems that have not yet been fully solved by currently available techniques. Accordingly, the subject matter of the present application has been developed to provide embodiments that overcome at least some of the shortcomings of prior art techniques.

Disclosed herein is a drivetrain system for a wave energy converter. The wave energy converter system includes a buoyant object, a reaction body coupled to the buoyant object by one or more lines, and one or more drivetrains coupled to one of the buoyant object or reaction body. The drivetrains include a sheave coupled to one of the buoyant object or reaction body, wherein the line is coupled to the sheave, wherein movement of the buoyant object relative to the reaction body applies a force to the sheave. The preceding subject matter of this paragraph characterizes example 1 of the present disclosure.

The force on the sheave drives a hydraulic actuator, coupled with an accumulator that is configured to provide a spring force. The preceding subject matter of this paragraph characterizes example 2 of the present disclosure, wherein example 2 also includes the subject matter according to example 1, above.

The force on the sheave drives a hydraulic motor/pump that is configured to provide a damping force. The preceding subject matter of this paragraph characterizes example 3 of the present disclosure, wherein example 3 also includes the subject matter according to any one of examples 1-2, above.

The force on the sheave drives a hydraulic actuator that is configured to provide both damping and spring forces. The preceding subject matter of this paragraph characterizes example 4 of the present disclosure, wherein example 4 also includes the subject matter according to any one of examples 1-3, above.

The force on the sheave drives an electrical generator that is configured to provide a damping force. The preceding subject matter of this paragraph characterizes example 5 of the present disclosure, wherein example 5 also includes the subject matter according to any one of examples 1-4, above.

The system further includes a gearbox coupled between the sheave and the actuator, motor, or pump. The preceding subject matter of this paragraph characterizes example 6 of the present disclosure, wherein example 6 also includes the subject matter according to any one of examples 1-5, above.

The system further includes a gearbox between the sheave and the hydraulic motor/pump. The preceding subject matter of this paragraph characterizes example 7 of the present disclosure, wherein example 7 also includes the subject matter according to any one of examples 1-6, above.

The sheave is a winding mechanism configured to wind the line. The preceding subject matter of this paragraph characterizes example 8 of the present disclosure, wherein example 8 also includes the subject matter according to any one of examples 1-7, above.

The rate of spring force can be changed through a selectable gas volume attached to the accumulator connected to the output of the actuator. The preceding subject matter of this paragraph characterizes example 9 of the present disclosure, wherein example 9 also includes the subject matter according to any one of examples 1-8, above.

The relative motion of the buoyant object and the reaction body applies a rotational force to the sheave. The preceding subject matter of this paragraph characterizes example 10 of the present disclosure, wherein example 10 also includes the subject matter according to any one of examples 1-9, above.

The sheave is configured to oscillate around a mean position. The preceding subject matter of this paragraph characterizes example 11 of the present disclosure, wherein example 11 also includes the subject matter according to any one of examples 1-10, above.

The damping force is provided by a mechanical pump. The preceding subject matter of this paragraph characterizes example 12 of the present disclosure, wherein example 12 also includes the subject matter according to any one of examples 1-11, above.

Disclosed herein is a drivetrain system for a wave energy converter. The drivetrain includes a sheave coupled to a buoyant object, wherein the buoyant object is coupled to a reaction body by one or more lines, wherein the line is coupled to the sheave, wherein movement of the buoyant object relative to the reaction body applies a force to the sheave. The preceding subject matter of this paragraph characterizes example 13 of the present disclosure.

The force on the sheave drives a hydraulic actuator which is configured to apply a spring force. The preceding subject matter of this paragraph characterizes example 14 of the present disclosure, wherein example 14 also includes the subject matter according to example 13, above.

The force on the sheave drives a hydraulic actuator that is configured to provide a damping. The preceding subject matter of this paragraph characterizes example 15 of the present disclosure, wherein example 15 also includes the subject matter according to any one of examples 13-14, above.

The force on the sheave drives a hydraulic actuator that is configured to provide both damping and spring forces. The preceding subject matter of this paragraph characterizes example 16 of the present disclosure, wherein example 16 also includes the subject matter according to any one of examples 13-15, above.

The force on the sheave drives an electrical generator that is configured to provide a damping force. The preceding subject matter of this paragraph characterizes example 17 of the present disclosure, wherein example 17 also includes the subject matter according to any one of examples 13-16, above.

The drivetrain further includes a gearbox coupled between the sheave and the generator. The preceding subject matter of this paragraph characterizes example 18 of the present disclosure, wherein example 18 also includes the subject matter according to any one of examples 13-17, above.

The sheave is a winding mechanism configured to wind the line. The preceding subject matter of this paragraph characterizes example 19 of the present disclosure, wherein example 19 also includes the subject matter according to any one of examples 13-18, above.

A wave energy converter system is disclosed. The system includes a buoyant object, wherein the buoyant object is a surface float, and a reaction body coupled to the buoyant object by two or more lines and the lines are flexible. The system further includes a drivetrain coupled to one of the buoyant object or reaction body. The drivetrain includes a sheave coupled to one of the buoyant object or reaction body, wherein two or more lines are coupled to the sheave, wherein movement of the buoyant object relative to the reaction body applies a force to the sheave. The drivetrain includes an actuator coupled to the sheave, wherein the force on the sheave drives the actuator, wherein the actuator is configured to apply a spring force. The system further includes a generator, wherein the sheave is configured to drive the generator. The preceding subject matter of this paragraph characterizes example 13 of the present disclosure.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
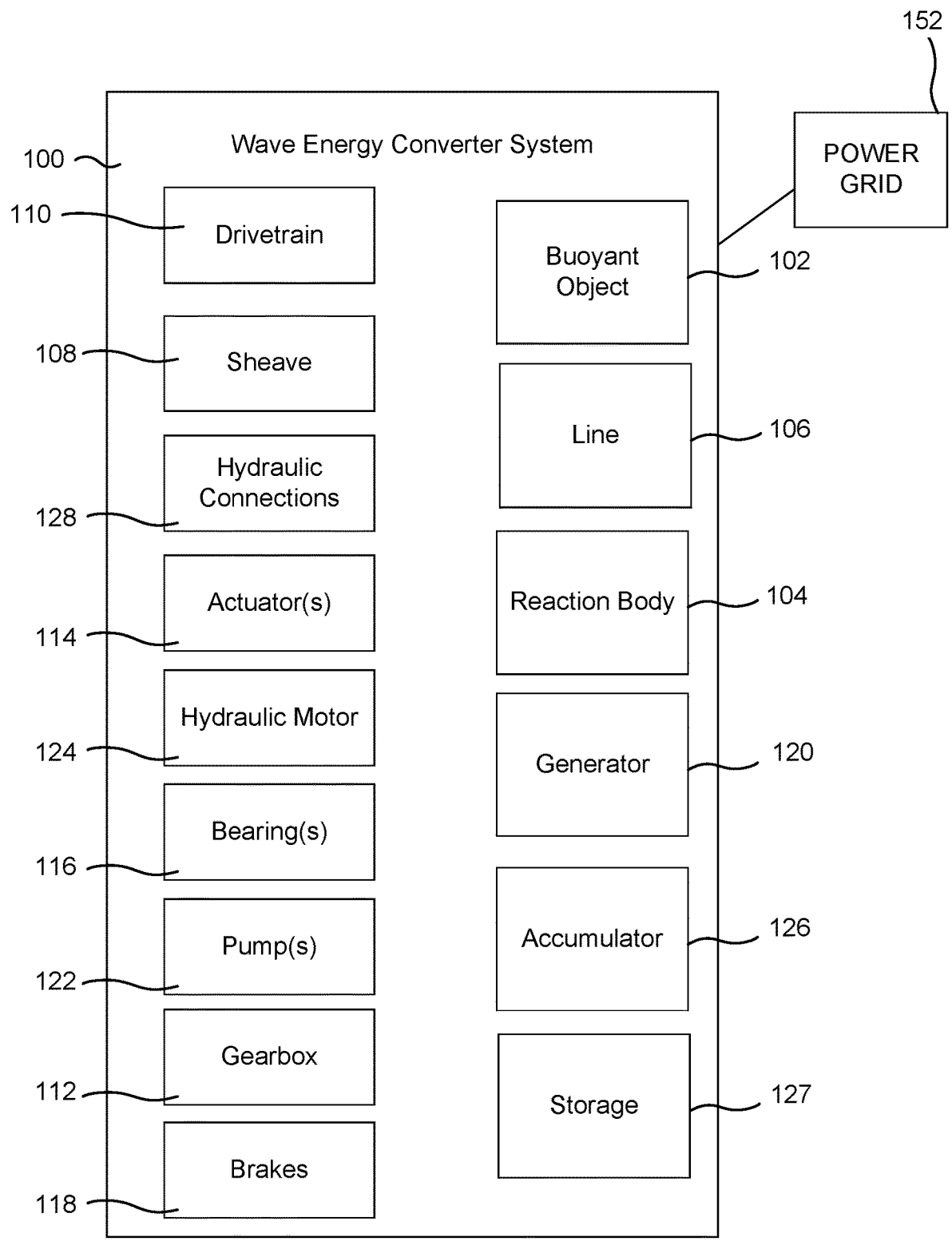
FIG. 1 is a schematic diagram illustrating an embodiment of a WEC system for a wave energy converter in accordance with one or more embodiments of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Embodiments of the invention described herein improve the use and function of wave energy converter (WEC) systems in harvesting energy in wave conditions in water. The relative movement of a buoyant object (such as a float or surface float) and a submerged reaction body (such as a submerged, suspended reaction structure or the sea floor) creates forces on the line or tendon between the two. Those forces may be harvested to drive a generator or stored for later use. Although waves do move periodically, the amplitude and frequency of the waves can vary greatly depending on the environmental conditions in which systems are placed.

Drivetrains for WECs may be stroke limited or may be damaged by especially rough wave conditions. Systems that can adapt to the great variability of wave conditions may provide additional power advantages and have a greater chance at extended survival. Typical drivetrains may require development and design of mechanisms to restrict travel within limited bounds. Advantages can be gained from WEC if longer strokes can be achieved to accommodate significant wave height.

By observation and measurement, sea states can be monitored to determine various parameters likely to be seen in a particular sea state including an average power, an annual average power, rated average power, rated wave condition, rated instantaneous power. The sea state may be taken to mean the specific wave period and wave height. The average power may be the time averaged power for a device in an environment or sea state. The annual average power may be the long-term time-averaged power across a given wave climate. The rated average power may be the average power in a particular sea state that represents the highest power operating conditions for the device. The sea states may be called rated wave conditions. As wave conditions fluctuate, the power absorbed by a WEC varies continuously over time. The instantaneous absorbed power may vary form 0 to a multiple of the average power. The rated instantaneous power may be the maximum power in a rated wave condition. A drivetrain designed and configured to absorb the rated instantaneous power will provide power advantages and an extended use lifetime.

Embodiments of this invention relate to a buoy/mooring system with a drivetrain configured to allow for a much larger stroke (practically unlimited) in a more compact space.

FIG. 1 is a schematic diagram illustrating one embodiment of a wave energy converter (WEC) system 100 in accordance with some embodiments of the present invention. Although the WEC system 100 is shown and described with certain components and functionality, other embodiments of the WEC system 100 may include fewer or more components to implement less or more functionality. Although many of the components are depicted as coupled to the buoyant object 102, in other embodiments, the components are within an enclosure along the line or tendon 106 or at the reaction body 104.

The WEC system 100 includes a buoyant object 102 and a reaction body 104 coupled together with a line or tendon 106. The buoyant object 102 is a surface float or a near surface float that moves or floats near or on the surface of a body of water. The buoyant object 102 moves with the waves of the body of water. As the buoyant object 102 oscillates on the surface of the body of water, the buoyant object 102 will move relative to the reaction body 104. The relative motion between the buoyant object 102 and the reaction body 104 creates tension and forces on the line or tendon 106. The forces from the relative motion are captured as is described more fully herein as well as in the references incorporated herein.

The buoyant object 102 is a buoy, buoy housing, float, or surface float that is configured to float at the surface or near the surface of the body of water. The buoyant object 102 may be an enclosure shaped to house the various components described herein. The buoyant object 102 may include various seals or other structural components to isolate an interior chamber that houses the various components.

The reaction body 104 may be any structure configured to be submerged in the body of water. In some embodiments, the reaction body 104 is an anchor attached to the sea floor. In some embodiments, the reaction body 104 is a heave plate or other structure that restricts movement in the water. In some embodiments, the reaction body 104 is the sea floor. As the buoyant object 102 oscillates on the surface of the body of water, the reaction body 104 will counteract such motion which will exert forces on the line or tendon 106.

The line or tendon 106 may be any type of cord, chain, rope, cable, etc. that is configured to couple the buoyant object 102 to the reaction body 104. Although only one line or tendon 106 is described in many embodiments herein, the WEC system 100 may include a plurality of tendons 106 which couple the buoyant object 102 to the reaction body 104. In some embodiments, the line or tendon 106 is configured to attach to a sheave 108 or other structural component on the buoyant object 102. In some embodiments, the sheave 108 may be within an interior chamber of the buoyant object 102 through a sealed entry point. In some embodiments, the line or tendon 106 is configured to attach to a sheave 108 or other structural component outside the buoyant object 102 with the sheave 108 or structural component configured to enter the interior chamber of the buoyant object 102 through the sealed entry point. While the sheave 108 is described as coupled to the buoyant object 102 in many embodiments described herein, in some embodiments, the sheave 108 may be coupled to the reaction body 104.

The WEC system 100 further includes a drivetrain 110. The drivetrain 110 is configured to receive an input force generated by the relative movement of the buoyant object 102 and the reaction body 104. Although the drivetrain 110 is shown and described with certain components and functionality, other embodiments of the drivetrain 110 may include fewer or more components to implement less or more functionality.

In some embodiments, the drivetrain 110 or drivetrain system may include various components. In some embodiments, the drivetrain 110 may include the sheave 108, a gearbox system 112, and actuator(s) 114. The drivetrain 110 may further be associated with various bearings 116, brakes 118, generator(s) 120, pumps 122, hydraulic motor 124, accumulator(s) 126, energy storage 127, and hydraulics 128. Embodiments described herein may or may not include all these components.

In some embodiments, the drivetrain 110 is configured to drive a motor such as a hydraulic motor 124, a generator 120 or may be configured to store energy in the storage 127 or an accumulator 126. In some embodiments, the wave energy converter system 100 is connected to the power grid 152. In one of the ways listed herein or similar ways, the WEC system 100 is configured to harvest wave energy.

In some embodiments, the sheave 108 is a mechanical connection that couples the line or tendon 106 to the buoyant object 102. The sheave 108 may be configured to allow rotational movement that allows the sheave 108 to oscillate around a mean position. In some embodiments, the sheave 108 is a winding mechanism and the sheave 108 is configured to wind the line or tendon 106 and unwind the line or tendon 106 as the buoyant object 102 follows the period of the wave. That is, as the relative distance between the buoyant object 102 and the reaction body 104 decreases, the line or tendon 106 will wind onto the sheave 108. Further, as the relative distance between the buoyant object 102 and the reaction body 104 increases, the line or tendon 106 will unwind from the sheave 108. In some implementations, the sheave is a drum or a grooved drum that allows the line or tendon 106 to wind along the grooves.

The sheave 108 may be coupled to the buoyant object 102 by way of a bearing 116 which is configured to allow the sheave 108 to rotate freely in a near frictionless state. The line or tendon 106, which is a tether between the buoyant object 102 and the reaction body 104 drives the motion of the sheave.

In some embodiments, the sheave 108 is coupled to one or more actuators 114. In some embodiments, the actuator is a hydraulic actuator. A hydraulic actuator may refer to a piston or a rotary actuator (motor or pump). As the sheave 108 rotates, a gearbox 112 or gear system connected to the sheave 108 may drive the one or more actuators 114. In some embodiments, the actuators 114 are rotary actuators. In some embodiments, the actuators 114 are linear actuators.

In some embodiments, the one or more actuators 114 are configured, either by use of more than one actuator or in some cases with one actuator, to split the force of the WEC (the WEC force) into a generator or damping force and a spring force. In some cases, potential spring force is released and added to the damping force. By use of a spring force, the damping force may vary equally around zero.

Figures 10A, 10B, 10C:
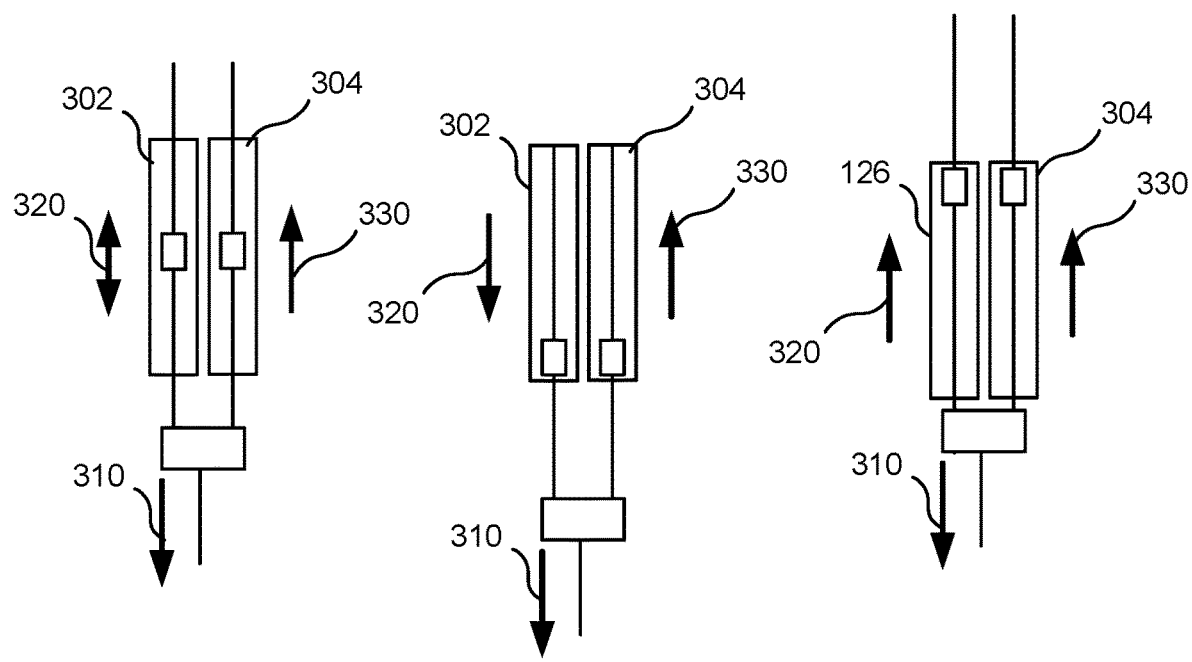
FIG. 10A is a schematic diagram of a distribution of a spring force and a damping force in accordance with one or more embodiments of the present invention.
FIG. 10B is a schematic diagram of a distribution of a spring force and a damping force in accordance with one or more embodiments of the present invention.
FIG. 10C is a schematic diagram of a distribution of a spring force and a damping force in accordance with one or more embodiments of the present invention.

As an illustrative example, see FIG. 10 shows how these forces may be separated for a circumstance when the reaction body or structure 104 is suspended beneath the float or buoyant object 102. For ease of discussion, linear cylinders are utilized for the damping force and the spring force. The spring force is related to the displacement of the system. As the Figures show, FIG. 10A shows the system at a mean displacement, FIG. 10B shows the system at the largest displacement and FIG. 10C shows the system at the smallest displacement. The system will oscillate back and forth. The damping force is related to the velocity of the system. As the system reaches the extremes as shown in FIGS. 10B and 10C, the damping force will be zero. The damping force will be at a maximum when the displacement is at a mean position as shown in FIG. 10A.

FIG. 10A also may illustrate a flat-water position of the system where the spring cylinder 304 offsets or fully supports the reaction body and a generator cylinder 302 exerts zero force. As example numbers, the reaction body may be exerting a 300 ton-force in a downward direction as noted by arrow 310. The spring cylinder 304 may be offsetting with a 300 ton-force in an upward direction as noted by arrow 330. In this case, the damping force is zero.

Referring now to FIG. 10B, a large extension force on the line is shown as the buoyant object moves up and away from the reaction body. This exerts a large downward force by the reaction body shown by arrow 310. The spring cylinder 304 reacts against some of this force as shown by arrow 330. The remainder is applied to the generator cylinder 302. As example numbers, the reaction body may be exerting a 700 ton-force while the spring cylinder is reacting with an additional 400 ton-force with a 100 ton-force applied to the generator cylinder 302.

Referring now to FIG. 10C, the reaction body and the buoyant object have moving towards each other. This decreases the WEC downward force shown by arrow 310. In this case, the spring force is greater than the WEC force and so the remainder of the spring force acts on the generator cylinder transferring stored energy in the spring cylinder 304 to the generator cylinder 302. As exampled numbers, the reaction body may be exerting only a 100 ton-force as shown by arrow 310 while the spring cylinder is releasing some stored energy with a 200 ton-force as shown by arrow 330. The difference is exerted on the generator cylinder 302 with a 100 ton-force as shown by arrow 320.

As shown by the example of FIG. 10, utilizing a spring or spring cylinder or actuator in such a manner, the generator cylinder 302 will oscillate equally around zero as the generator cylinder 302 oscillates between a 100 ton-force in both directions.

The spring force may be applied by various ways including by way of a hydro-pneumatic spring, an accumulator, external air tanks, pumps, or other similar components. The damping force may be described as the difference between the applied WEC force and the spring force.

Referring back to FIG. 1, the drivetrain 110 may include various components including pumps 122, hydraulic connections 128, bearings 116, gearboxes 112, brakes 118, actuators 114, or hydraulic motors 124 to drive a generator 120 or store energy in an accumulator 126 or energy storage 127.

Figure 2:
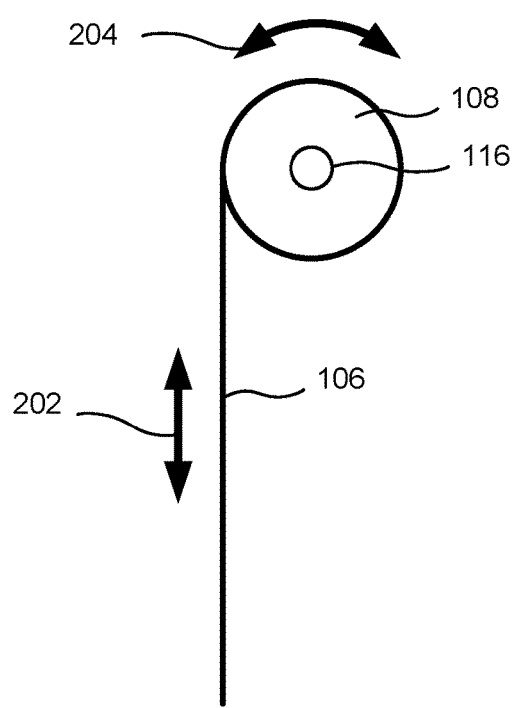
FIG. 2 is a side view illustrating sheave and tendon line in accordance with one or more embodiments of the present invention.

Referring now to FIG. 2, a sheave 108 is shown with a line or tendon 106. The sheave 108 is depicted in a side view to show the movement of the line or tendon 106 and the sheave 108. The sheave 108 may be coupled to a buoyant object 102 (not shown) with a bearing 116. This allows the sheave 108 to rotate about the bearing 116 in either direction as shown by arrows 204. As the line or tendon 106 moves up and down as shown by arrow 202, the sheave 108 will be driven to rotate.

Figure 3:
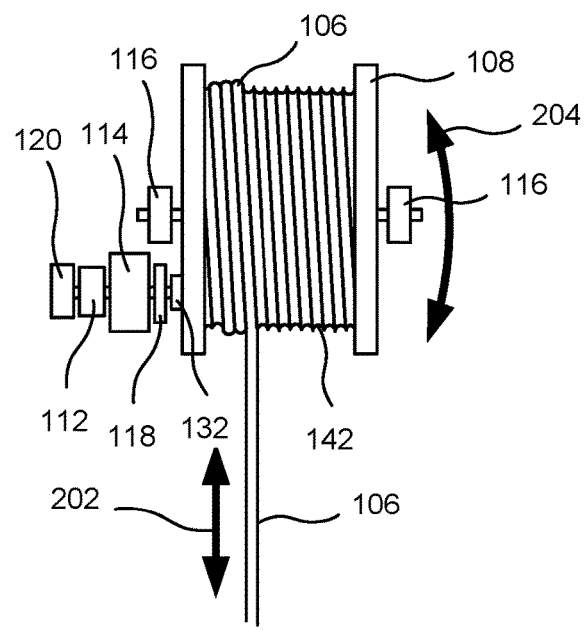
FIG. 3 is a schematic diagram and front view of a drivetrain for a WEC with a sheave, tendon line, actuator, and a generator in accordance with one or more embodiments of the present invention.

Referring now to FIG. 3, a front view of a sheave 108 is shown. The sheave 108 is depicted as a drum with grooves 142 on which the line or tendon 106 winds and unwinds. The sheave 108 may be coupled to a buoyant object 102 (not shown) with a bearing 116. This allows the sheave 108 to rotate about the bearing 116 in either direction as shown by arrows 204. As the line or tendon 106 moves up and down as shown by arrow 202, the sheave 108 will be driven to rotate. In addition, a ring gear drives a pinion gear 132 causing the pinion gear 132 to rotate as the line or tendon 106 winds and unwinds on the sheave 108. The pinion gear 132 drives an actuator 114. More than one actuator 114 may be utilized. The actuator 114 is a rotary actuator that is driven to rotate. The pinion gear 132 may be coupled to two actuators 114, one of which functions as the spring actuator and the other as a generator actuator. The spring actuator and the generator actuator may interact similar to the manner described in conjunction with FIG. 10.

The actuator 114 may be coupled, via a gearbox 112, to a generator 120. Specifically, the generator actuator may be coupled to the generator 120, driving the generator 120 as the line or tendon 106 winds and unwinds and oscillates with the waves.

Figure 4:
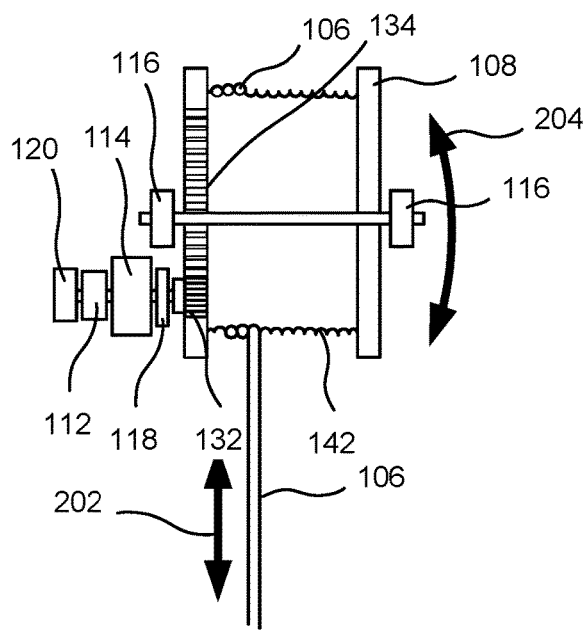
FIG. 4 is a schematic diagram and cut-away front view of a drivetrain for a WEC with a sheave, tendon line, actuator, and a generator in accordance with one or more embodiments of the present invention.

Referring now to FIG. 4, a cut-away view of the sheave 108 is shown. As can be seen, the sheave 108 includes a ring gear 134 that interacts with the pinion gear 132 and drives the pinion gear 132. As described with the other figures, the line or tendon 106 may wind on the grooves 142 of the grooved drum. Each of the components may be directly connected or may utilize gears or a gearbox 112, brakes 118, bearings 116, and hydraulic connections 128. A gearbox can increase the rotations to allow for efficiencies in travel.

In embodiments where a separate spring actuator is utilized, the spring actuator may be a rotary actuator. Utilization of a rotary actuator and a rotary sheave allow for a compact configuration that has a very long stroke length as the "length" of the line or tendon 106 wraps itself on the drum over and over, if needed.

A wide range of wave conditions will likely result in a very wide spread of velocities and stroke length. Embodiments described herein allow the drivetrain to compensate for the wide spread of velocities and stroke length via the spring actuator and rotary sheave.

The system may further utilize accumulators 126 or storage 127 to strategically store and release forces such that the damping force oscillates back and forth in a regular manner even in changing weather and wave conditions.

Figure 5:
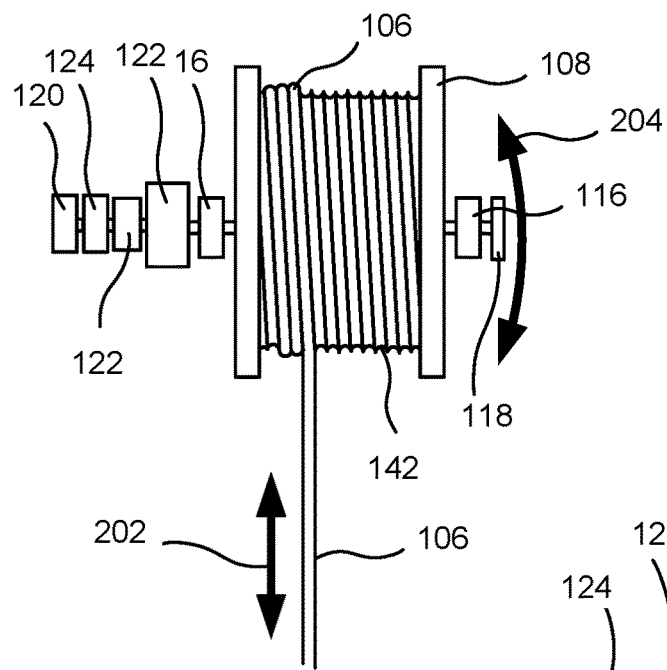
FIG. 5 is a schematic diagram and front view of a drivetrain for a WEC with a sheave, tendon line, actuator, and a generator in accordance with one or more embodiments of the present invention.

Referring now to FIG. 5, a front view of a drivetrain 110 and sheave 108 is shown. The drivetrain 110 may be similar to the embodiments described in conjunction with FIGS. 2-4. The drivetrain 110 may utilize pumps 122 as the actuators. As depicted, there are two pumps 122 in which on may be utilized as a spring actuator and a generator actuator and the other one my charge a storage accumulator 126 (not shown). As before, the sheave 108 may be coupled to a buoyant object 102 (not shown) with a bearing 116. This allows the sheave 108 to rotate about the bearing 116 in either direction as shown by arrows 204. As the line or tendon 106 moves up and down as shown by arrow 202, the sheave 108 will be driven to rotate.

In the illustrated embodiment, the generator 120 is not connected directly to the actuators but is driven by a hydraulic motor 124. The hydraulic motor 124 may be run by the storage accumulator 126.

Figure 6:
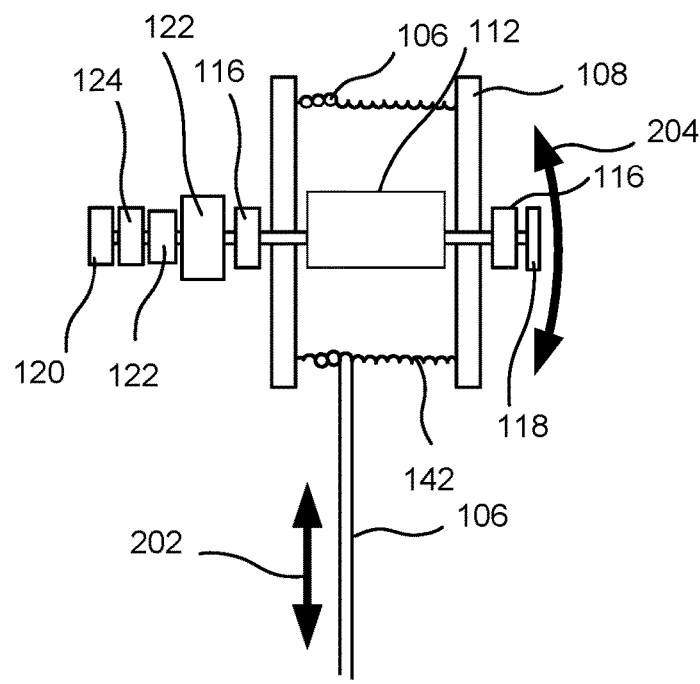
FIG. 6 is a schematic diagram and cut-away front view of a drivetrain for a WEC with a sheave, tendon line, actuator, and a generator in accordance with one or more embodiments of the present invention.

Referring now to FIG. 6, a cut-away view of the drivetrain 110 is shown. As shown, the sheave 108 may be coupled to a buoyant object 102 (not shown) with a bearing 116. This allows the sheave 108 to rotate about the bearing 116 in either direction as shown by arrows 204. As the line or tendon 106 moves up and down as shown by arrow 202, the sheave 108 will be driven to rotate. A gearbox 112 is connecting the sheave 108 to the pumps 122.

Figure 7:
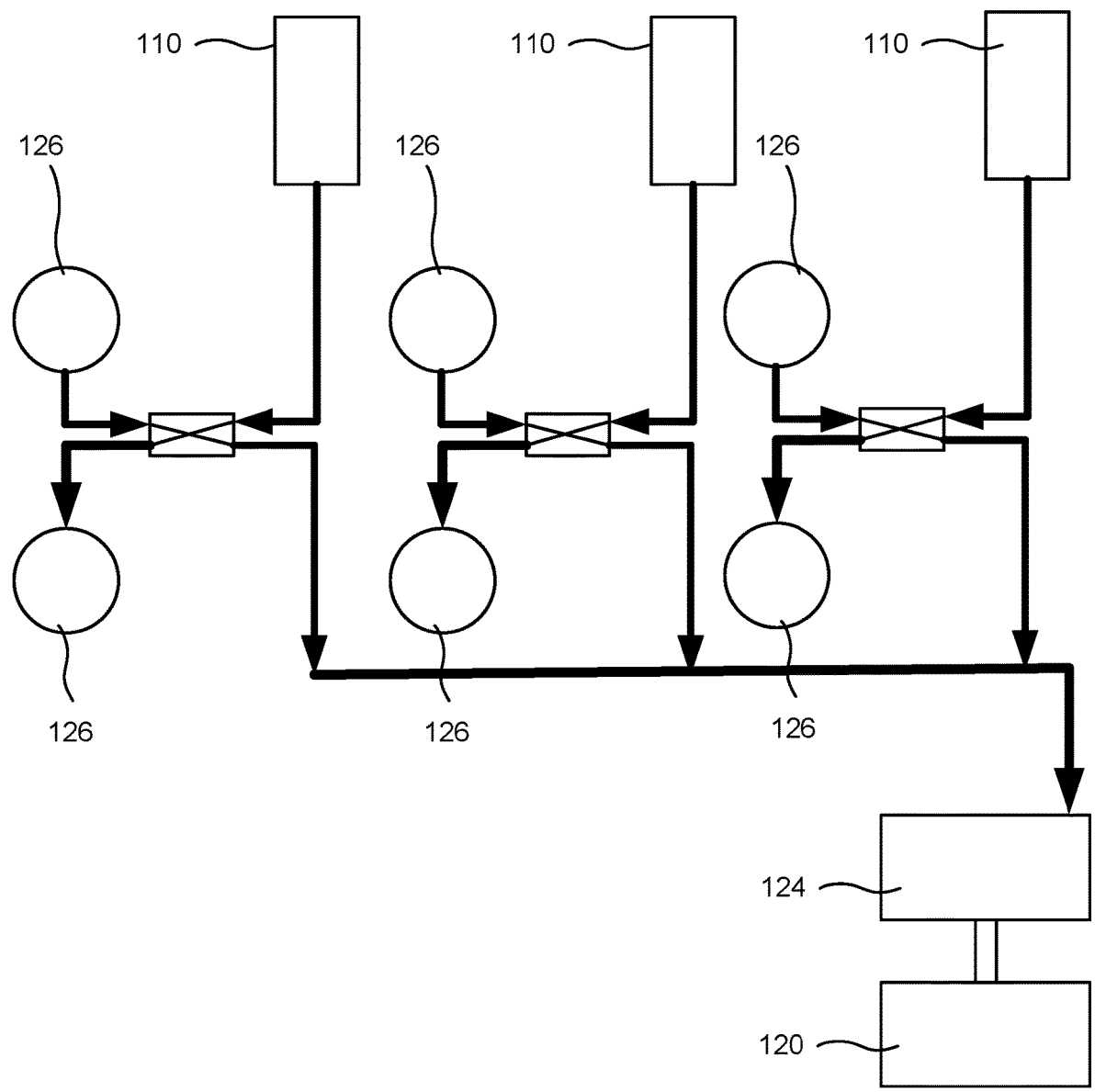
FIG. 7 is a schematic diagram of a plurality of drivetrains coupled together in accordance with one or more embodiments of the present invention.

Referring now to FIG. 7, a plurality of drivetrains 110 are connected to drive a hydraulic motor 124 and ultimately a generator 120. Each of the drivetrains 110 may be connected a pair of accumulators 126 which may be used to effect or perform the spring force and further drive a common hydraulic motor 124 and generator 120. In some embodiments, one of the accumulators 126 may be utilized for the spring force. The other accumulator in the pair may be used to store energy and released to drive the common hydraulic motor 124.

Various configurations may be envisioned, arranged in parallel or in series, in which multiple drivetrains 110 are utilized together to efficiently harness energy and drive a generator or multiple generators. Each of the drivetrains may be configured differently allowing for optimization as the configurations may optimize different functions, where some of the drivetrains may utilize storage or accumulators and some may utilize hydraulic motors, and some may have different gear ratios to allow for different outputs.

Figure 8:
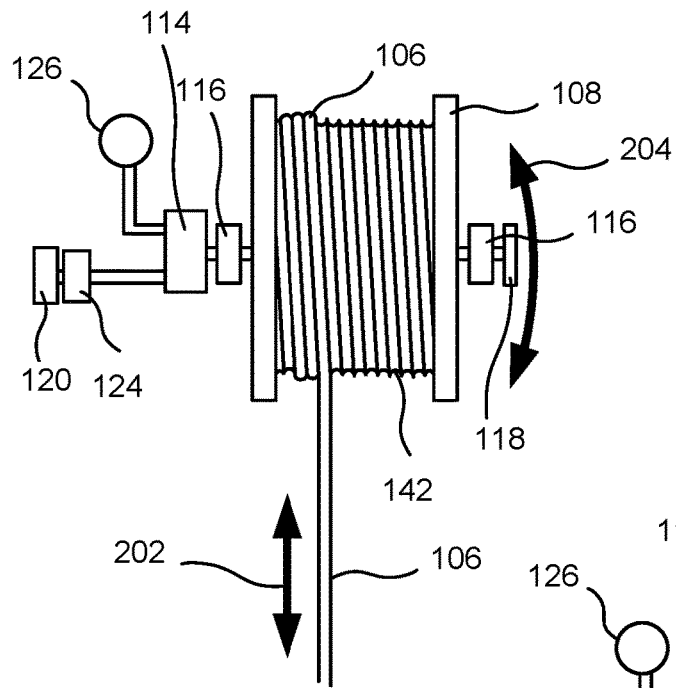
FIG. 8 is a schematic diagram and front view of a drivetrain for a WEC with a sheave, tendon line, actuator, and a generator in accordance with one or more embodiments of the present invention.

Referring now to FIG. 8, another drivetrain 110 is shown. The drivetrain 110 may utilize, as before, a sheave 108 that winds and unwinds the line or tendon 106 as buoyant object 102 (not shown) and the reaction body 104 (not shown) move relative to each other in the wave conditions. A gearbox 112 may drive the actuator 114. The single actuator 114 may be utilized to compensate with the spring force, store energy in an accumulator 126, and further drive a hydraulic motor 124 that drives a generator 120 or generators.

The rotary actuator is able to carry out all these functions in the illustrated embodiments and would necessarily function to supply a net force that is the sum of the spring force and the damping force. The spring force would always be large, positive and would track the displacement of the sheave 108 relative to the reaction body 104. Meanwhile the damping force would be adjusted to track the velocity of the sheave and would oscillate between positive and negative.

Figure 9:
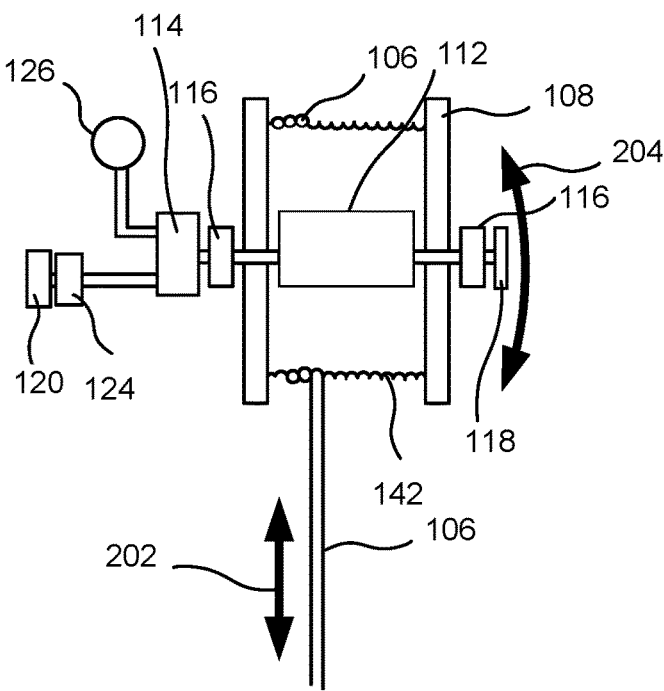
FIG. 9 is a schematic diagram and cut-away front view of a drivetrain for a WEC with a sheave, tendon line, actuator, and a generator in accordance with one or more embodiments of the present invention.

Referring to FIG. 9, a cut-away view of the drivetrain is shown. The illustrated embodiment is a schematic diagram showing the gearbox 112 which is driven by the sheave 108. The gearbox 112 drives the actuator 114 which, in turn, stores energy in the accumulator and drives the hydraulic motor 124 and generator 120, all while also supplying a spring force.

Various embodiments are described herein. Each embodiment may utilize features from the other embodiments specifically described as well as the embodiments within the scope of this description. The variations are not recited merely for the sake of brevity.

The various embodiments may utilize various output cylinders and input cylinders which are configured to transfer an output force to a generator. The embodiments may utilize various valves, actuators, accumulators, overpressure valves, controllers, and other components that are configurable to compensate with a spring force that allows the damping force to oscillate approximately around 0 force, from negative to positive and back.

The drivetrain 110 may be configured to change automatically based on a wave pattern or may be controlled remotely through a controller. The spring force may be adjusted as needed to ultimately affect the damping force and allow it to oscillate around an equilibrium state. In some embodiments, the drivetrain 110 may be adjusted manually prior to deployment of the system.

In some embodiments, the drivetrain 110 may be coupled to gas charged accumulators or air tanks. In some embodiments, the gas charged accumulator provides elastic absorption of energy with an effective spring constant being a function of extendable air volume in an external air tank array. In some embodiments, the extendable air volume is configured to provide a variable force providing an offset force to the weight of the reaction body.

In some embodiments, the external air tank array includes an array of differently sized air tanks that function differently. The size or volume of the air tank will dictate the rise in spring force.

In some embodiments, the actuators or accumulators are pressurized to provide an offset force opposite to the weight of the reaction body 104. In some embodiments, the actuators or accumulators are pressurized in order to provide a mean load to the line or tendon 106 that offsets any mean offset tension within the line or tendon 106.

Embodiments of apparatuses are described herein that may include on some of the features and components of the systems described. Additionally, other methods of using and making the systems described herein are contemplated.

Although the foregoing disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The present subject matter may be embodied in other specific forms without departing from its spirit or essential characteristics. The described embodiments are to be considered in all respects only as illustrative and not restrictive.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity This application is related to U.S. application Ser. No. 15/217,772, filed on Jul. 22, 2016, which is incorporated by reference herein in its entirety. This application also is related to U.S. application Ser. No. 14/181,574, filed on Feb. 14, 2014, which claims the benefit of priority of U.S. Application No. 61/809,155, filed on Apr. 5, 2013. This application is related to U.S. application Ser. No. 15/268, 341, filed on Sep. 16, 2016. This application is related to U.S. application Ser. No. 15/675,511, filed Aug. 11, 2017.

What is claimed is:

1. A wave energy converter system, comprising:
a buoyant object;
a reaction body coupled to the buoyant object by one or more lines, wherein the reaction body is suspended beneath the buoyant object;
one or more drivetrains coupled to one of the buoyant object or reaction body, wherein the one or more drivetrains comprise:
a sheave coupled to one of the buoyant object or reaction body, wherein the one or more lines are coupled to the sheave, wherein movement of the buoyant object relative to the reaction body applies a force to the sheave, wherein the force on the sheave drives a hydraulic actuator, coupled with an accumulator that is configured to store and release a damping force and provide a spring force, and wherein the accumulator is configured to run a hydraulic motor.

2. The system of claim 1, further comprising a gearbox coupled between the sheave and the hydraulic actuator.

3. The system of claim 1, further comprising a gearbox coupled between the sheave and the hydraulic motor.

4. The system of claim 1, wherein the sheave is a winding mechanism configured to wind the one or more lines.

5. The system of claim 1, wherein a rate of the spring force can be changed through a selectable gas volume attached to the accumulator connected to the output of the hydraulic actuator.

6. The system of claim 1, wherein relative motion of the buoyant object and the reaction body applies a rotational force to the sheave.

7. The system of claim 1, wherein the sheave is configured to oscillate around a mean position.

8. A drivetrain for a wave energy converter, comprising:
a sheave coupled to a buoyant object, wherein the buoyant object is coupled to a reaction body by one or more lines, wherein the line is coupled to the sheave, wherein movement of the buoyant object relative to the reaction body applies a force to the sheave,
wherein the force on the sheave drives a hydraulic actuator, coupled with an accumulator that is configured to store and release a damping force and provide a spring force, and
wherein the accumulator is configured to run a hydraulic motor.

9. The drivetrain of claim 8, further comprising a gearbox coupled between the sheave and the hydraulic actuator.

10. The drivetrain of claim 8, wherein the sheave is a winding mechanism configured to wind the line.

11. A wave energy converter system, comprising:
a buoyant object, wherein the buoyant object is a surface float;
a reaction body coupled to the buoyant object by two or more lines and the lines are flexible, wherein the reaction body is suspended beneath the buoyant object;
a drivetrain coupled to one of the buoyant object or reaction body, wherein the drivetrain comprises:
a sheave coupled to one of the buoyant object or reaction body, wherein two or more lines are coupled to the sheave, wherein movement of the buoyant object relative to the reaction body applies a force to the sheave;
a hydraulic actuator coupled to the sheave, wherein the force on the sheave drives the hydraulic actuator, wherein the hydraulic actuator is configured to apply a spring force, and coupled with an accumulator that is configured to store and release a damping force; and
a hydraulic motor, wherein the accumulator is configured to drive the hydraulic motor.

* * * * *